Aug. 29, 1944.   G. S. DUNHAM   2,357,255
REACTOR WITH SEPARATOR OF ENTRAINED SOLIDS FROM GASES
Filed July 31, 1941
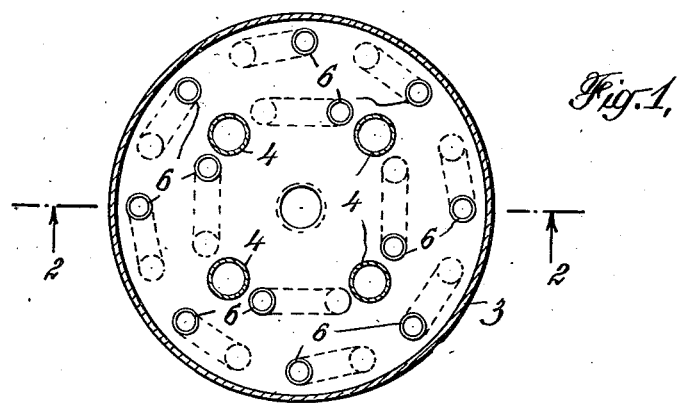
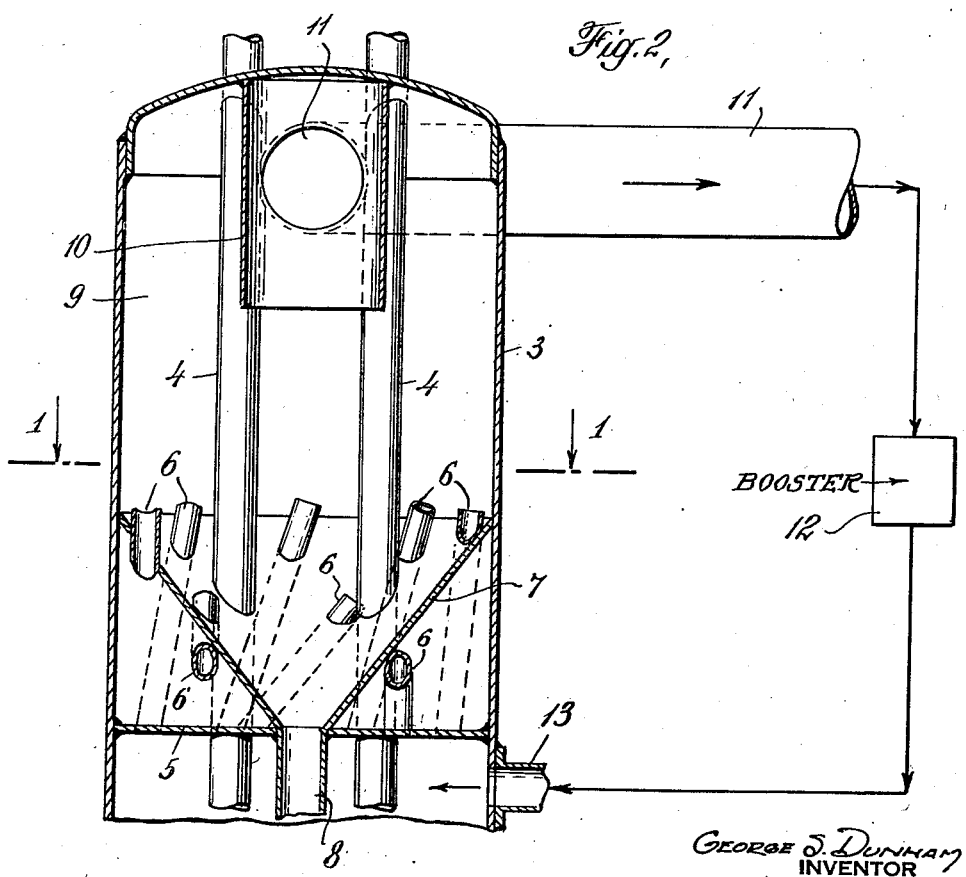
GEORGE S. DUNHAM
INVENTOR
BY
ATTORNEY Patented Aug. 29, 1944

2,357,255

UNITED STATES PATENT OFFICE 2,357,255

REACTOR WITH SEPARATOR OF ENTRAINED SOLIDS FROM GASES

George S. Dunham, Merion, Pa., assignor to Socony-Vacuum Oil Company, Incorporated, New York, N. Y., a corporation of New York Application July 31, 1941, Serial No. 404,794

2 Claims. (Cl. 23—284)

This invention has to with the separation of entrained solid particles from effluent gases from processes wherein solid material in particle form is contacted with gases or vapors.

One such process is that shown in Payne, U. S. Patent 2,227,416, wherein spent adsorbent, such as fuller's earth, is revivified by flowing it downwardly through a reaction zone in countercurrent contact with a rising stream of regenerating gases. Similar process arises in the vapor phase conversion of hydrocarbons wherein heated vapors are passed through a particleform contact mass which may itself constitute or which may carry material catalytic to the desired conversion. In any such process, whether the bed of solid particles is fixed or moving, entrainment and carryover of solid particles may be serious. This is particularly true when high space velocities of gas per pound of solid material are used. The problem becomes acute with some processes wherein flowing solid material passes countercurrent to using gas or vapors, since in some of these processes space velocities are such as to almost "float" the solid particles upon the gases or vapors.

This invention has for an object the provision of method and apparatus for the separation of entrained solid particles under the conditions above outlined. It has for an object the provision of a type of construction for devices of this sort which is readily adaptable to reactors of this type. It has for an additional important object the provision of a method of operating entrainment separators which is of wide applicability under a variety of circumstances.

In order to more clearly understand this invention, reference is now made to the drawing attached hereto, the two figures of which show, in a somewhat diagrammatic fashion, apparatus appropriate for the practice of the invention. Of these figures, Figure 2 is a vertical section of apparatus embodying my invention, and Figure 1 is a horizontal section, taken at a plane indicated upon Figure 2.

Reading the two figures of the drawing together, 3 represents the shell of a vessel, in which, below the level shown herein, there is conducted a reaction involving contact between a particle form solid and a gaseous or vaporous medium, herein generally spoken of as gas. Solid material is fed to this reaction vessel through feed pipes 4 extending from a storage bin, (not shown), above the vessel 3, into the reaction space. Above the reaction space in vessel 3 there is a partition 5, through which lead pipes or tubular passages 6. Gases emerging from the body of solid material in the reaction space into the space immediately below partition pass into the space immediately below partition pass through tubes 6 into the upper portion of 3, above the partition. The space above the partition is formed into a centrifugal separator for the separation of entrained solid material from these gases in the following manner. A second partition, 7, in the form of a downwardly tapering cone, is provided, and the tubes 6 are so placed that while their center lines lie each within a plane parallel to the axis of vessel 3, their exit ends are radially displaced, all in the same direction. This serves to cause the gas streams passing through these tubes 6 to impinge against the inner wall of vessel 3 and flow tangentially therein whereby the entrained solids are separated, to fall to conical partition 7 and be returned therefrom to the reaction zone by pipe 8, which extends into said reaction zone into the body of solid therein.

Centrally located in the upper portion of the centrifugal separator space 9, there is provided the usual gas withdrawal hood 10, as a circular tube, dependent from the top head of vessel 3, and gases leave the apparatus through pipe 11. The apparatus has the feature of uniformly withdrawing gases containing entrained material from all portions of the disengaging space immediately below partition 5 flowing those gases in a minimum of path into the separator, and still giving to each portion of gas as it enters the separator a properly centrifugal motion and a positive direction so that solid material entrained therein will be carried to the wall of the separator and dropped.

Since the efficient operation of a separator of this type depends upon the imparting of a high velocity to the solids upon entry to the separator, in order that due to their higher momentum they will maintain that path when the direction of the gas stream is changed and so leave the gas stream, an interesting feature of this invention surrounds that operation shown diagrammatically at the right of Figure 2. Here we find, as shown by the arrows, a portion of the solid-free gas withdrawn from the separator through pipe 11 is diverted to "booster" 12, which may be a fan of usual type, a jet pump arrangement, or other appropriate mechanism for increasing the pressure of the gas by a relatively slight amount, and this gas is then returned through pipe 13 into the space below partition 5.

This gas so returned serves to controllably increase the amount of gas flowing through tubes 6 and so increase the momentum of solid particles entrained therein and thus secure better separation, since like increases in the carrying capacity of the gases within space 9 are not caused by this operation. When properly balanced, significant increases in the efficiency of centrifugal separators may be obtained by application of this principle of recycling separated gas.

Returning to partition 5, it will be remembered that its essential function is one of properly positioning the lower ends of tubes 6, and so, some form of spider construction may be substituted for the solid construction shown, the sealing of space 9 from the reaction space being accomplished by the cone 7. Also, in certain cases it may be quite feasible to accomplish the same purpose by firmly fixing tubes 6 in cone 7 in proper position, and doing away with even the vestiges of partition 5.

I claim:

1. In a reactor wherein particle-form solid material is treated with gasiform reagent an assembly for separating entrained solid from effluent gas which comprises a reactor vessel so constructed as to provide an initial gas-solid disengaging space in the upper end of said reactor, a cylindrical separator body thereabove, a downwardly tapering conical partition dividing said separator body from the initial disengaging space, tubular means extending through said partition for the transfer of gas containing entrained solid from the initial disengaging space to the separator, the axis of said tubular means lying in a plane parallel to the axis of the cylindrical separator and being placed at an angle to said axis, means to withdraw separated entrained solid from the apex of said partition and return it to the reactor below said initial gas-solid disengaging space, and means to remove cleaned gas from the central portion of said separator.

2. In a reactor wherein particle-form solid material is treated with gasiform reagent an assembly for separating entrained solid from effluent gas which comprises a reactor vessel so constructed as to provide an initial gas-solid disengaging space in the upper end of said reactor, a cylindrical separator body thereabove, a downwardly tapering conical partition dividing said separator body from the initial disengaging space, tubular means extending through said partition for the transfer of gas containing entrained solid from the initial disengaging space to the separator, the axis of said tubular means lying in a plane parallel to the axis of the cylindrical separator and being placed at an angle to said axis, means to withdraw separated entrained solid from the apex of said partition and return it to the reactor below said disengaging space, means to remove cleaned gas from the central portion of said separator and means to return a portion of said cleaned gas to the disengaging space.

GEORGE S. DUNHAM.